United States Patent [19]
Meyer

[11] 3,762,491
[45] Oct. 2, 1973

[54] STEERING COLUMN ACTUATOR

[75] Inventor: Ulrich Meyer, Lilienthal, Germany

[73] Assignee: Vereinigte Flugtechnische Werke-Fokker Gesellschaft mit beschrankter Haftung, Bremen, Germany

[22] Filed: June 16, 1972

[21] Appl. No.: 263,427

[30] Foreign Application Priority Data
Dec. 3, 1971  Germany .................. G 71 45 514.6
July 1, 1971  Germany .................. G 71 25 310.6

[52] U.S. Cl. ............................................. 180/79.1
[51] Int. Cl. ............................................. B62d 5/04
[58] Field of Search ................. 180/79.1; 35/10, 35/11; 318/580, 587, 599

[56] References Cited
UNITED STATES PATENTS
3,033,305  5/1962  Harned et al. .................... 180/79.1
3,668,499  6/1972  Malloy .............................. 318/587

Primary Examiner—Stanley H. Tollberg
Attorney—Ralf H. Siegemund

[57] ABSTRACT

An actuator unit for cooperation with a steering column having an electric motor with disk rotor and drive shaft, a tachometer is flanged to the motor and runs in synchronism therewith; an intermediate control shaft is geared to the drive shaft as well as to the steering column. A switch actuator and a potentiometer tap are also drivingly connected to the control shaft for displacement in response to rotation of the control shaft. The motor is controlled for operating the steering column or to simulate a reaction force against manual steering operation. Both types are used and electrically cross-linked for an unmanned vehicle, test stand simulator combination.

17 Claims, 8 Drawing Figures

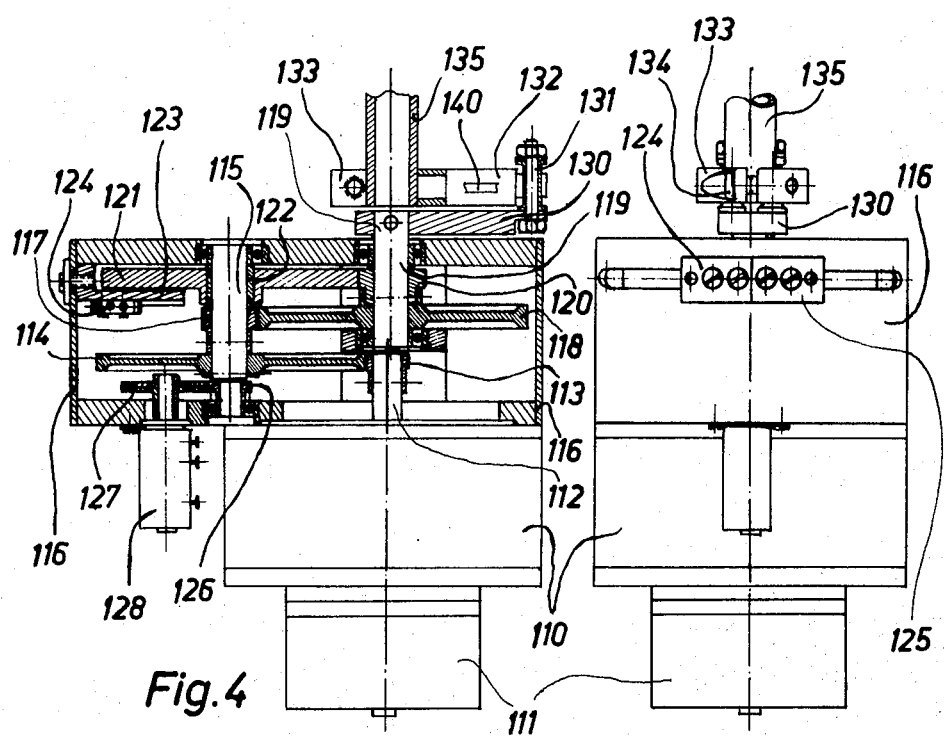
Fig. 4
Fig. 5
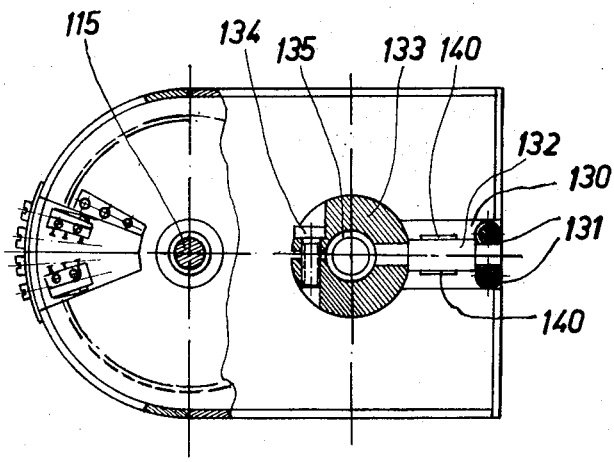
Fig. 6

STEERING COLUMN ACTUATOR

BACKGROUND OF THE INVENTION

The present invention relates to control and actuator devices which include an electro motor for connection to a steering column by means of particular mechanical linkage and transmission members. It is within the scope of the invention to provide for duplication of the reaction forces in a steering column for a remote control simulator, to provide for operation of a steering column in a remotely controlled vehicle, and to provide systems combination of such devices.

Vehicle endurance tests or tests on accidents and involving, e.g., automobiles, should be carried out with unmanned vehicles which are remote controlled, so that particularly very dangerous conditions can be duplicated without endangering people. The remote control system will include a test and control stand with a panel or the like on which is displaced a representation of the test track, or the view the driver has in each instant is made visible by means of closed circuit television. This command station can be constructed as simulator with as realistic representation of the remote controlled vehicle as possible, to convey to the person sitting in the simulator and conducting the test a "true" impression of the conditions encountered by the vehicle on the track, just as if he were actually driving the vehicle.

The several control elements in the simulator of the test stand should be located, constructed and arranged as they are in the vehicle itself. Thus, as the test person "drives" the simulator, he should, on one hand, drive the test vehicle on the track by remote control, while, on the other hand, he should experience sensations similar to those experienced by a driver under similar conditions. This latter point, of course, includes the visual representation mentioned, but it includes also a "feel", e.g. on the simulator steering column, as to the reaction of the running vehicle to his, the remote controllers, steering action. Thus, the reaction force on the steering column in the driven vehicle should be duplicated as much as possible in the steering column of the simulator. If the simulator is a stationary replica of the actual vehicle, these several conditions can be more or less met.

The remotely controlled vehicle is usually equipped with motors driving the several actuators through suitable mechanical linkage. However, the known actuator systems cannot be used directly for controlling the steering column as the controller must not only have a sufficiently large control range, but switching times and feedback of position to the simulator must meet specific requirements as to speed, to obtain optimum conditions in the closed system vehicle-simulator.

DESCRIPTION OF THE INVENTION

It is an object of the present invention to provide for an actuator which can be used in a remote controlled vehicle as well as for reaction force duplication in a simulator for such a vehicle. It is another object of the invention to provide actuator construction for a closed system, simulator-test vehicle, in which by virtue of similarities in the construction of the actuators the test simulator will produce a true reaction response to steering in the simulator when carried out by the test vehicle and as transmitted back to the simulator.

In accordance with the preferred embodiment of the present invention, it is suggested to use a motor with disk-shaped rotor and having flanged thereto a tachometer. An intermediate transmission or control shaft couples the rotor to the steering column through suitable gearing and controls also disposition of a potentiometer tap which provides a direct representation of the disposition of the steering column. The intermediate shaft controls also two limit switches whose positions determine the control and actuator range.

The particular combination is constructed to meet the various requirements. The motor has particularly low inertia and is, therefor, capable of fast response. The tachometer generator provides directly a signal proportional to the actuator speed, while the potentiometer indicates the position of actuator and steering column. The limit switches should be adjustable as to position for purposes of range variations. Also, the control shaft is to operate a cam follower either directly or through a spindle for operating the limit switches. The entire unit can be enclosed in a casing which can easily be connected to the steering column of a vehicle. A unit of this variety will also be used in the simulator, but the actuator is used in this case to duplicate the reaction force.

A closed system, thus, uses one actuator unit of the stated variety on the steering column of the test vehicle and a somewhat modified actuator unit in the test stand and simulator. Each unit has such a motor, tachometer generator and potentiometer. The vehicle steering motor is controlled by a feedback system that uses the potentiometer of the vehicle unit as representation of the controlled variable (which is the steering column position and angular deflection) as feedback, and the potentiometer output of the simulator unit is the command input for that feedback system in the test vehicle. The potentiometer output of the test vehicle is also transmitted to the simulator and serves as command input in a control circuit thereof. The simulator control circuit receives a signal that represents the tension on the simulator steering column as a controlled variable, and the control circuit operates the steering motor in the simulator so that the simulator driver who turns the simulator steering column, experiences a resistance.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accomapnying drawings in which:

FIG. 1 is a section view of an actuator constructed in accordance with a first example for the preferred embodiment of the invention and as connected to the steering column of an unmanned, remote controlled vehicle;

FIG. 2 is a top elevation of the device of FIG. 1;

FIGS. 3a and 3b show section views of details in transverse planes;

FIG. 4 is a section view of an actuator for duplication of reaction forces in a simulator;

FIG. 5 is a side elevation of the device of FIG. 4;

FIG. 6 is a top elevation of the device of FIGS. 4 and 5; and

FIG. 7 is a block diagram of a system linking an actuator of FIGS. 1, 2, 3a and 3b in a vehicle with an actuator of FIGS. 4, 5 and 6 in a simulator.

DESCRIPTION OF THE DRAWINGS

Proceeding now to the detailed description of the drawings.

Figure 1:
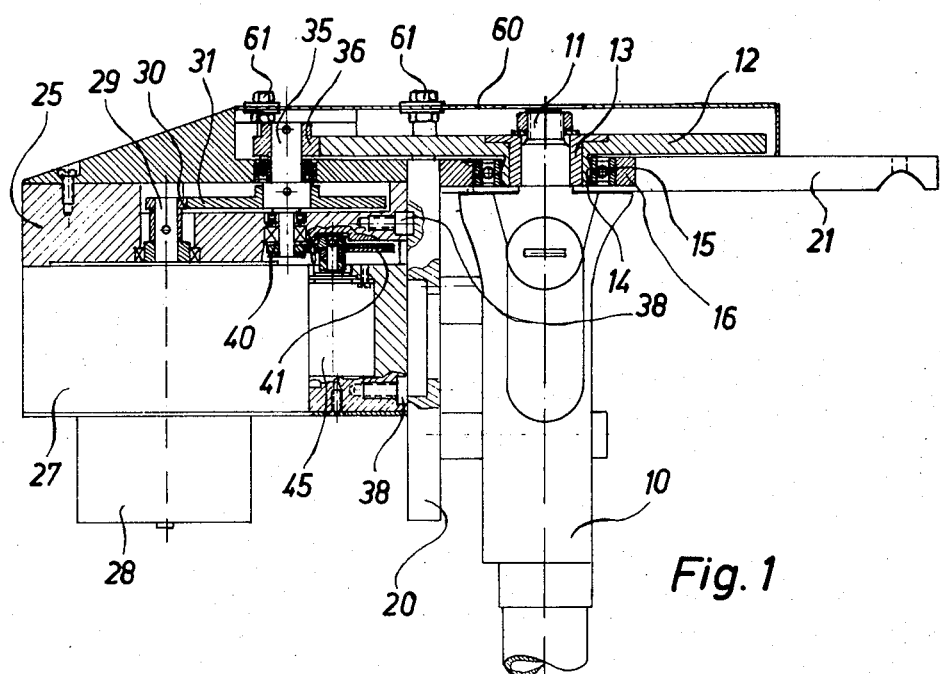
FIG. 1 shows the steering column 10 of an unmanned, remote controlled vehicle having an upper pin 11 for receiving a gear 12. Gear 12 carries an axial sleeve 13 serving as adapter to different types of cars. Gear 12 itself has an axial bushing or hub 14 having an outwardly bulging, i.e. convexly curved outer contour. The ball hub 14 is inserted in the inner ring, serving an inner race of a ball bearing 15.

A support plate 16 is disposed on the upper part of steering column 10, and the outer race of ball bearing 15 is mounted to that plate 16. The actuator mechanism in accordance with the invention is mounted on a support plate 20 which is bolted to plate 16; a fastening element 21 runs from plate 20 to the dashboard of the car for connection thereto. In other words, the support arrangement 21-16-20 is mounted to the dashboard in a position that the hub 14 can engage the ball bearings, while inserted adapter 13 can be received by pin 11 and can be bolted to the steering column. Ball-shaped sleeve 14 and ball bearing 15 could be replaced by a swivel bearing for the same function in the combination.

The actuator mechanism is contained in a housing 25 which is secured to mounting plate 20. A low inertia motor 27 with disk rotor and flanged tachometer generator 28 is contained in housing 25. The motor has a drive shaft 29 to which is secured a pinion 30, meshing a gear 31 which, in turn, sits on and turns a control shaft 35. This intermediate and transmission shaft 35 carries a pinion 36 which meshes gear 12 on the steering column.

The distance between shafts 29 and 35 is fixed, but the distance between shaft 35 and steering column 10 must be adjustable. Accordingly, casing 25 is provided with adjustment pins 38, situated at the side of the casing facing plate 20. Pins 38 are threaded so that the lateral disposition of casing 25 relative to plate 20 can be adjusted in micrometer fashion.

Figure 2:
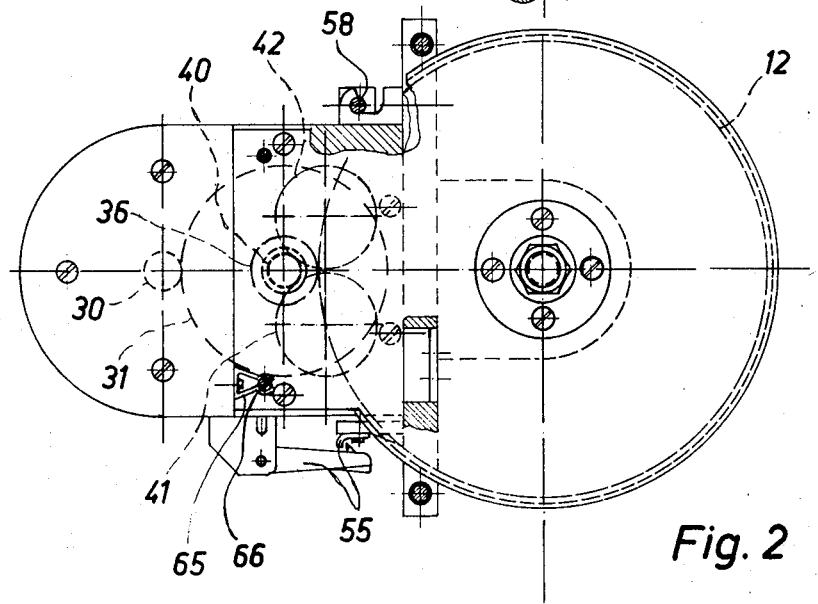

Shaft 35 carries another pinion 40, meshing two gears 41 and 42 (see FIG. 2). Gear 41 is under tension and sits on the drive shaft for the displaceable tap of a potentiometer 45. The gear may drive a worm gear 41, and thee potentiometer tap rides on the worm gear upon rotation. Tensioning of the gear 41 is needed to eliminate back lash or play, so that the potentiometer position represents the position of shaft 35 without hysteresis effect. As can be seen best from FIG. 2, gear 42, and, therefor, potentiometer 45, is situated somewhat off the line of shortest distance between the several shafts (29 and 35) and the steering column. The gear 42 is symmetrically disposed in relation to a gear 41 for potentiometer tap drive and with reference to that line, or a plane transverse to the drawing of FIG. 2 running through the axes of shafts 29, 35 and 10. Gear 42 drives a threaded spindle or worm gear 46.

Figures 3A, 3B:
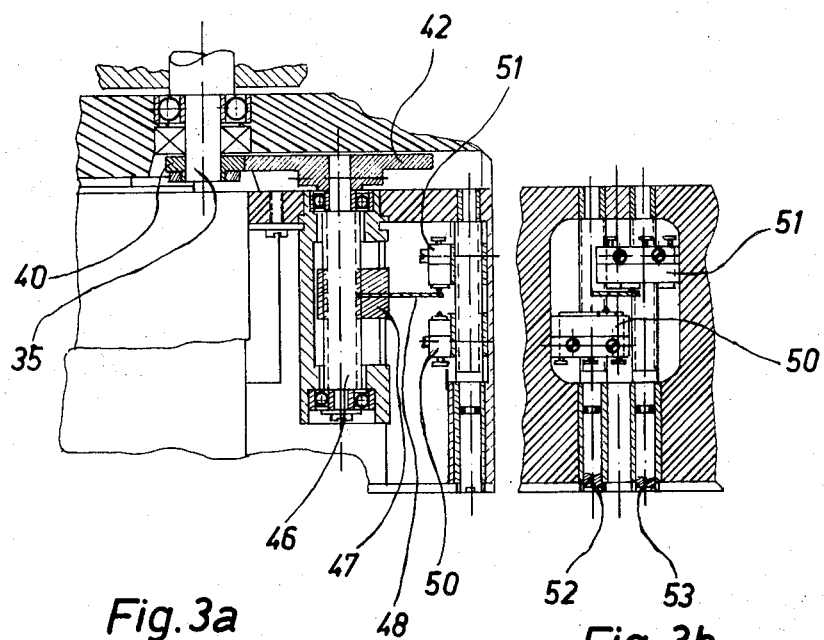

FIG. 3a shows the spindle in greater detail. A follower member 47 is threaded on spindle 46, acting as worm gear, and carries a contact spring 48. As spindle 46 turns, follower 47 moves up or down so that arm 48 operates either a limit switch 50 or a limit switch 51.

The disposition of the limit switches determines the actuator range of the system, as their distance determines limit positions for up and down displacement of follower 47 which, in turn, represents an angular range for the several pinions and gears in the transmission system. The two limit switches 50 and 51 are disposed separately on spindles 52 and 53 for adjustment of the range of the actuator system, which depends on the total angle range covered by the steering column from end to end. Spindles 52 and 53 each have grooves respectively for O-rings in order to prevent accidental displacement of the limit switches.

Releasable lock fasteners in form of tension locks 55 are provided for releasably fastening casing 25 to mounting plate 20. These locking elements 55 are situated on one side of the casing. Pivot bearings 58 are provided on the other side of the casing, serving as hinges which can be released. Upon unfastening locks 55, casing 25 is pivoted away and can be lifted out of the hinges, transverse to the plane of the drawing of FIG. 2 for complete removal from plate 20.

A cover 60 is provided for covering the upper part of casing 25 as well as gear 12. Cover 60 is fastened to these elements by means of pins 61 and lock nuts or the like. This way, cover 60 can be slid off laterally, uncovering the top of column 10. On the other hand, the various components can be removed without taking off cover 60. After unlocking members 55, a clip 65 opens upon pivoting casing in the hinge and releases a pin 66 on cover 60.

The disk-rotor type motor 27 combines high speed response with great accuracy and the tachometer flanged to the motor provides output voltage that is proportional to the speed of the motor. This voltage can be used in a servo loop that links a vehicle simulator with the remote control unit of the remotely controlled unmanned vehicle. The tachometer control provides rate information for a position control loop of the unmanned vehicle as command controlled from the simulator. The arrangement as shown is quite compact in design.

The threaded pins 38 have plastic inserts for self-locking of the threaded bolts so that they remain readily in their adjusted position. This way, the play of the gearing is reduced as the actuator retains position adjusted initially for minimum lash back. The potentiometer tap as driven via tensioned gear 41 will be continuously adjusted in true follower operation and likewise without play, so that the position of the adjusting and actuating mechanism is represented by the potentiometer signal without hysteresis effect. Electric connection to the potentiometer is obtained upon installation.

As adapter sleeve 13 is replaceable, different types of cars can be equipped with the same type of actuator (or even the same actuator, if it survived a previous crash test). The hinge and lock mechanism permits ready recovery of the unit after a test drive.

The unit described above is particularly designed for installation in a remotely controlled car. A somewhat modified but basically similar unit for the simulator and test stand will now be described with reference to FIGS. 4 to 6, providing particularly duplication of steering column reaction, so that the "feel" of the column in the simulator is the same as in a real car.

The basic unit in FIGS. 4 et seq. includes also a low inertia motor 110 with disk rotor and flanged tachometer generator 111. The drive shaft 112 of the motor carries a pinion 113 meshing a gear 114. Gear 114 is secured to a control shaft 115 journalled in casing 116, and carrying a pinion 117 for rotation therewith. A gear 118 sits on the output drive shaft 119 of the actuator and meshes pinion 117. Shafts 115 and 119 are journalled in casing 116 by means of ball bearings.

Output shaft 119 of this particular actuator carries another pinion 120 meshing a gear 121 which is journalled on shaft 115 by means of a bearing sleeve 122. Gear 121 carries a thusly pivoted follower arm 123 for operation of two limit switches 124 and 125. Limit switches 124 and 125 are mounted on carriers which, in turn, are mounted to casing 116 in adjustable but stationary position. Limit switches determine the actuator range, and the adjustment of the limit switches permits adjustment of that range accordingly. The follower 123 runs also against these carriers after operating switch 124 or 125; the switches, thus, serve mechanically as stop, preventing further angular deflection of the follower and, therefor, of gear 121 and of the gearing coupled thereto. FIG. 5 shows these aspects in greater detail.

A pinion 126 sits on control shaft 115 meshing a tensioned gear 127. Gear 127 drives a spindle which adjusts the tap of a potentiometer 128. The potentiometer may serve as command signal source for the servo system that includes the automatic steering control in the unmanned test vehicle.

As stated, this particular actuator unit as presently described, is part of the test stand and simulator. The unit is mounted so that the axis of shaft 119 is coaxial with the steering column 135 of the simulator. Shaft 119 has one end projecting from casing 116 and a follower arm 130 is mounted thereon for pivoting on the axis of shaft 119. Arm 130 has bores for receiving a pair of bolts.

Column 135 carries a slotted ring 133 at its lower end which can be secured thereto by means of small bolt 134. A bendable rod 132 is rigidly secured to ring 133 and extends therefrom in radial direction. The (radially) outer end of rod 132 is secured to follower 130 by means of the screws 131 and a sleeve so that there is no play between the parts. A particular portion of rod 132 is subjected the most to bending upon turning the steering column and holding the end of the rod or arm 132 is position. Two tension measuring strips 140 are mounted to rod 132 at this location and on opposite sides of the rod. The strips 140 provide electrical signals which represent bending stress on the rod. Suitable probes (not shown) detect these electrical signals on and in stress sensors 140. Four sensors may be connected in a bridge.

Upon turning the steering column manually, the turning motion is transmitted upon shaft 119 via 132–130 and the control shaft 115 as geared thereto turns likewise. Accordingly, potentiometer 128 is adjusted so that an electric signal can be derived therefrom in representation of the desired steering position.

On the other hand, it can readily be seen that as long as the motor 110 is not energized, turning of the steering column 135 will result in practically no resistive reaction to speak of. If, however, the motor is energized so as to tend to turn the steering column in the opposite direction, the simulator driver will feel a resistance he has to overcome to turn the steering column in the desired direction.

Figure 7:
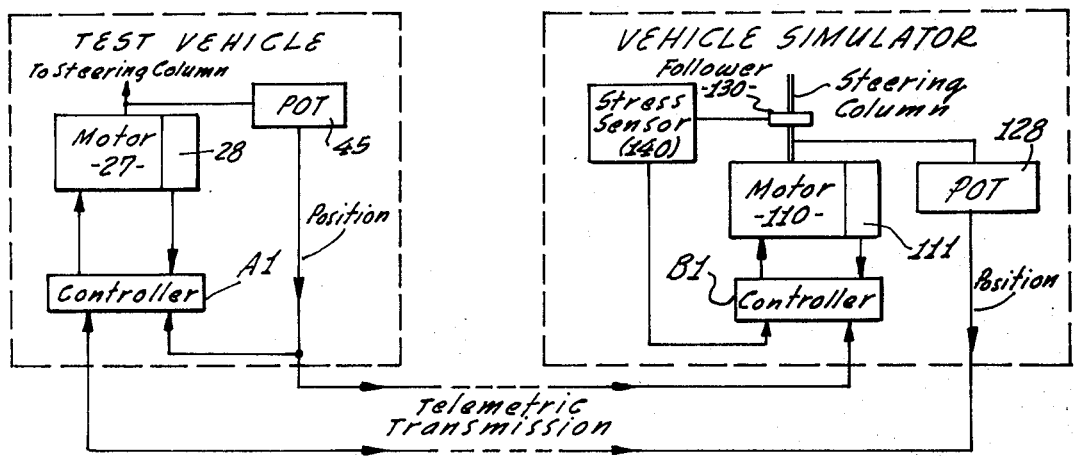

Turning now to FIG. 7, there is illustrated a complete system which includes a test vehicle A and a vehicle simulator B. The test vehicle includes a steering column actuator as shown in FIGS. 1, 2, 3a and 3b with actuator motor 27 and position feedback potentiometer 25 and position rate signal generator 28. A controller A1 controls the motor 27 in response to the potentiometer signal for position feedback. The command follower and reference input for this feedback control loop is derived from the simulator B.

Reference numeral C denotes generally the telemetric link between unmanned test vehicle A and simulator B so as to obtain remote control by means of commands from B to A, while vehicle response and position signals run from A to B. The telemetric and remote control transmission link includes only two signals, there are, of course, more signals in the complete system, such as commands for acceleration and braking etc. The link C includes the signal path for the command and reference input for controller A1, as well as a second path for feeding the output of potentiometer 45 to simulator B.

The simulator B includes a steering column reaction simulation as explained with reference to FIGS. 4, 5 and 6. The actuator is represented here by the motor 110, and by the position indicating potentiometer 128, follower 130 with stress sensors 140 and position rate (speed) signal generator 111. A controller B1 for motor 110 receives the transmitted signal from potentiometer 45 in the test vehicle as reference input while the output of the stress sensors 140 is the controlled variable that is fed back as second input to the controller. The rate information from generator 111 quickens the response. The potentiometer 128 in simulator B is the source for the command and reference input for the controller A1 in the test vehicle.

As the driver in the simulator turns the steering column 135, shafts 119 and 115 follow and the potentiometer 128 is adjusted. Its output signal is telemetrically transmitted to the controller A1 in the remote controlled vehicle A for operating the actuator motor 27 therein. The position of potentiometer 45 in the remote controlled vehicle results in a signal that is fed back to the test stand in representation of the steering column displacement the test vehicle undergoes. That signal when received in the test stand or simulator B operates the control circuit B1 which controls motor 110. Thus, motor 110 produces a counter force opposing the force exerted by the test stand driver upon the steering column 135. The tension measuring strips 140 produce signals and together provide the feedback for the controller B1. The tachometer 111 provides a voltage to be used as rate information in the servo loop for motor 110.

As motors 27 and 110 are constructed with disk rotors, they both respond quite fast due to low mass and, therefor, low inertia. Whenever the limit switches are operated, the voltage supply is interrupted. The limit switches in the two actuators should be adjusted for concurrent response. Switches 124 and 125 may act to interrupt the power supply so that reversal on the steering column 135 in the simulator is required to re-initiate operation. It can be seen that not only is the reaction force in the steering column of the test vehicle duplicated in the test stand simulator, but if the steering wheel of the latter is released, the wheel is actually straightened again automatically and return to the zero position by operation of actuator motor 110.

The invention is not limited to the embodiments described above but all changes and modifications thereof not constituting departures from the spirit and scope of the invention are intended to be included.

I claim:

1. An actuator unit for cooperation with a steering column comprising:

an electric motor with disk rotor, having a drive shaft, a tachometer flanged to the motor and running in synchronism therewith; an intermediate control shaft geared to the drive shaft;

a potentiometer having a tap drivingly connected to said control shaft for displacement in response to rotation of the control shaft; coupling means for drivingly connecting the control shaft to the steering column; a switch actuator drivingly coupled to said control shaft; and limit switches disposed in adjustable position and operated by the switch actuator to obtain representation of a steering column adjustment and turning range.

2. An actuator as in claim 1, wherein the coupling means include a gear drivingly mounted on the steering column, and a pinion on the control shaft meshing the gear.

3. An actuator as in clai 2, the gear provided with an adapter sleeve.

4. An actuator as in claim 2, wherein the gear has a hub, mounting means being provided for the actuator and including means for journalling the hub of the gear.

5. Actuator as in claim 4, the hub having convexly shaped outer contour for universal mounting and directional adaptation.

6. Actuator as in claim 1, including a pinion on the control shaft, a gear driven by the pinion, a worm gear driven by the pinion driven gear, and a follower on the worm gear moving upon rotation of the worm gear for operating the limit switches.

7. Actuator as in claim 1, including a pinion on the control shaft, and a tensioned gear meshing the pinion and operating the potentiometer.

8. Actuator as in claim 1, and including mounting means for releasably mounting the actuator in particular adjustable relation to the steering column.

9. Actuator as in claim 1, the coupling means including an element subjected to stress upon motor steering column interaction via the coupling means.

10. Actuator as in claim 9, the coupling means including an actuator shaft disposed coaxially to the steering column and geared to the control shaft; an actuator arm on the actuator shaft rotating therewith, a stress-strain member coupling the arm to the steering column, and signal means on the member to provide electrical signal representing the strain undergone by the member, if the motor resists external actuation of the steering column against the force of the motor.

11. An actuator as in claim 1, including control means connected to be responsive to the output of the potentiometer in feedback configuration and receiving additionally a command signal for obtaining control of the steering column.

12. An actuator as in claim 11, the control means connected for receiving additionally the output of the tachometer as rate information.

13. An actuator as in claim 1, including control means connected to be responsive to an externally developed control signal and further connected to be responsive to said stress sensing means to control the motor for obtaining particular dynamic resistance against external operation of the steering column against the force of the motor.

14. An actuator as in claim 13, the control means connected for receiving additionally the output of the tachometer as rate information.

15. An actuator as in claim 1, cooperating with a second actuator for a second steering column and having motor, driving control shaft, coupling means connecting the control shaft to the second steering column, and a potentiometer operated by the second control shaft, each actuator having a control circuit for the respective motor, the outputs of the respective potentiometers provided to the control circuits of the respective other actuator, for obtaining control of the second actuator and of the second steering column in response to a signal developed or the first potentiometer as operated by the first steering column so that the second steering column follows the first steering column, the second potentiometer providing a signal to the control circuit of the first motor for control of the coupling to the first steering column to obtain a resistive force against oppositely directed steering of the first steering column.

16. An actuator as in claim 15, the control means for the motor of the first actuator responding additionally to stress developed in the coupling means.

17. An actuator as in claim 15, wherein the signal developed on the second potentiometer controls the control for the second motor in feedback configuration with the signal developed on the potentiometer of the first actuator serving as command signal.

* * * * *